United States Patent [19]

Gills

[11] Patent Number: 4,999,942
[45] Date of Patent: Mar. 19, 1991

[54] FISHING LURE

[75] Inventor: Blake Gills, Gurdon, Ark.

[73] Assignee: Smithwick Lures, Inc., Shreveport, La.

[21] Appl. No.: 435,255

[22] Filed: Nov. 13, 1989

[51] Int. Cl.[5] .............................................. A01K 85/00
[52] U.S. Cl. .................................... 43/42.45; 43/42.32
[58] Field of Search ................ 43/42.45, 42.47, 42.48, 43/42.46, 42, 42.32, 42.35

[56] References Cited

U.S. PATENT DOCUMENTS

| | | | |
|---|---|---|---|
| 664,476 | 12/1900 | Hall | 43/42.45 |
| 751,365 | 2/1904 | Woods | 43/42.45 |
| 1,385,627 | 7/1921 | Lane | 43/42.32 |
| 1,881,823 | 10/1932 | McKenzie | 43/42.47 |
| 2,714,778 | 8/1955 | Megerle | 43/42.32 |
| 3,045,382 | 7/1962 | Watkins | 43/42.45 |

OTHER PUBLICATIONS

*Bass Pro Shops*, 1989, Catalog, p. 163, "Devil's Toothpick".

Primary Examiner—Kurt Rowan
Attorney, Agent, or Firm—Laney, Dougherty, Hessin & Beavers

[57] ABSTRACT

A fishing lure which has a tapered, elongated body provided with a retrieving line eye at its forward end, and a hook at the rear end. The body is of generally frustoconical configuration over about the forward two-thirds of the body. The rear one-third of the body is of generally frustoellipsoidal configuration. The body carries a second hook suspended from the bottom of the body at a location slightly more than half way from the rear end to the forward end. The body is circular in transverse cross-section at all points over its length.

2 Claims, 1 Drawing Sheet

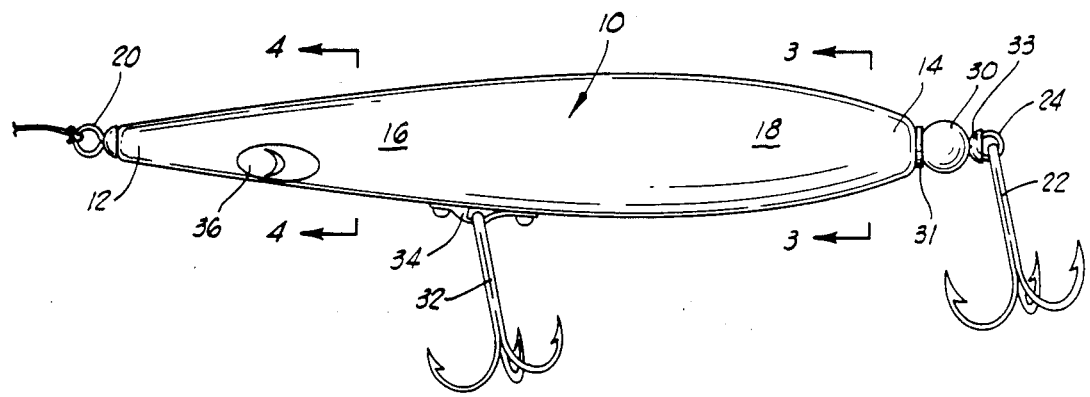
FIG. 1
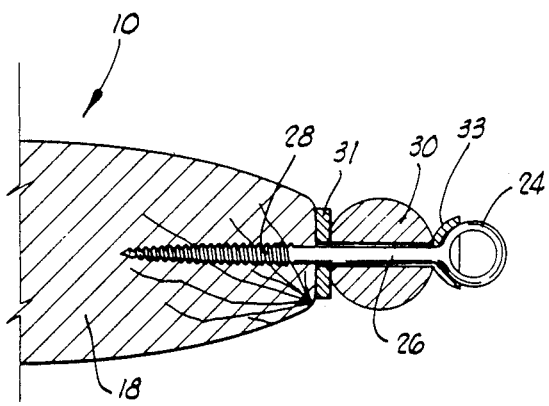
FIG. 2
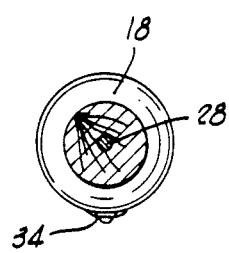 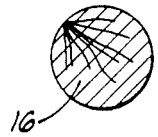
FIG. 3  FIG. 4

FISHING LURE

FIELD OF THE INVENTION

This invention relates to fishing lures, and more particularly, to crank baits which are cast and then retrieved by cranking a reel, and which include a hard body carrying one or more fishing hooks.

BRIEF DESCRIPTION OF THE PRIOR ART

A great variety of types of fishing lures have been heretofore known and used. Perhaps the closest in overall general appearance to the lure of the present invention are the Devil's Horse ® lure of Smithwick Lure, Inc., of Shreveport, La., a lure made by Repala, and having an elongated body shape resembling a minnow. None of these described lures have the overall configuration and body shape of the present lure, none are arranged so that the eye for the pull line for the lure is arranged at, and secured to, a small end of the lure body, and none have the unique, highly effective bobbing and oscillating action during retrieve which is characteristic of the lure of the present invention.

BRIEF DESCRIPTION OF THE PRESENT INVENTION

The present invention is a uniquely configured fishing lure which has a tapered, elongated body which is generally frustoconically configured over about the forward two-thirds of the body, and frustoellipsoidally configured over at least one-third of the length of the body closest to the rear end thereof. The forward end of the body carries an eye to which a retrieving line is attached, and the rear end of the body carries an eye to which a hook is attached. The body carries a second hook suspended from the bottom of the body at a location slightly more than half way from the rear end to the forward end, and at all points along its length, the body is circular in transverse cross-section.

On retrieve, the action of the lure in the water is very unique. The small forward end of the lure at the apex of the frustoconical section of the lure body tends to ride upwardly in the water, and extend slightly out of the water at a shallow angle to the upper surface of the water. The lure then wags or oscillates from side-to-side during retrieve, with the forward portion of the lure intermittently submerging momentarily and then thrusting forward out of the water and wiggling from side-to-side for a brief interval of time. This swimming action has been found to be very effective in attracting fish to the lure and enables the lure to be used successfully on most occasions.

An important object of the invention is to provide a lure which is not difficult to manufacture, yet is highly effective in its swimming action on retrieve, and because of this unique action is effective in attracting and catching fish.

Another object of the invention is to provide a lure which is mechanically strong and durable and characterized in having a long and trouble free operating life, and which can be utilized effectively by fishermen with relatively little experience.

Additional objects and advantages of the invention will become apparent as the following detailed description of the invention is read in conjunction with the accompanying drawings which illustrate a preferred embodiment of the invention.

General Description of the Drawings

FIG. 1 is a side elevation view of a fishing lure constructed in accordance with the present invention.

FIG. 2 is a sectional view of a detail of the lure construction in which a specific mounting subassembly is used for mounting a tail hook at the rear end of the lure in a way such that it is more strongly retained in the lure body and exhibits a longer and more trouble-free service life by reason of the illustrated construction.

FIG. 3 is a sectional view taken along line 3—3 of FIG. 1.

FIG. 4 is a sectional view taken along line 4—4 of FIG. 1.

DETAILED DESCRIPTION OF A PREFERRED EMBODIMENT OF THE INVENTION

Referring initially to FIG. 1 of the drawings, the fishing lure of the invention includes an elongated lure body which is designated generally by reference numeral 10, and which includes a nose or forward end 12, and a tail or rear end 14. The lure body 10 is symmetrical over its entire length in the sense of having a tapering external surface, and having, at all points therealong, a circular transverse cross-sectional configuration. The latter aspect will be perceived when FIGS. 3 and 4 are viewed The lure body 10 may be thought of as having a generally frustoconical configuration extending from the nose or the forward end of the lure rearwardly for about two-thirds of the total length of the lure. At this point, the base of the frustoconical section of the lure flows evenly into, and is merged with, a frustoellipsoidal portion which extends over about the rear onethird of the body of the lure. These zones are referred to in FIG. 1 by the reference numeral 16, in the case of the frustoconically-shaped forward portion of the lure body, and by the reference numeral 18, in the case of the frustoellipsoidally-shaped portion 18 located at the tail of the lure.

At the forward end of the lure body 10, a retrieving line eye 20 is secured to the lure body in conventional fashion, such as by the extension of a screw, or threaded shaft, into the lure body at this location. The eye 20 is used in a conventional way to facilitate the securement of a flexible line 21 to the eye to permit the lure to be retrieved by the fisherman as it is worked through the water. As will be explained, the lure is essentially a top water lure, and when worked back toward the fisherman after a cast, will appear to break the surface intermittently as the fisherman periodically jerks lightly on the retrieving line.

At the opposite or rear end of the lure body 10, the lure carries a hook 22. The hook 22 may, as illustrated, be a treble hook which is secured to the lure body frustoellipsoidal section 18 in the manner best illustrated in FIG. 2 of the drawings. Here it will be perceived that the hook 22 is mounted on an eye or ringlet 24 shown at one end of an elongated shaft 26. The shaft 26 has a plurality of helically formed threads 28 thereon adjacent the point at the end of the shaft 26 opposite the eye 24. The shaft 26 is extended through a spherical spacer element 30 and through a hole in the center of a 5/16" nickel-plated or brass washer 31. A semi-spherical or concavo-convex cap washer 33 is also placed on the opposite side the spherical spacer element from the washer 31. This semi-spherical, concavo-convex cap washer 33 functions to prevent the hook 22 from swinging back into a position where the barbs on the hook can abrade or impale the body of the lure. This construction assures that the bending moment applied to the shaft 26 as a result of a fish striking the hook 22 will not cause the shaft 26 and the eye 24, which it carries, to be pulled out of the lure body relatively early during the life of the lure. It also allows the lure to be extricated from brush where the hook has become fouled with less chance of damage to the lure, or loss of the hook, than would otherwise be the case.

At a location which is slightly more than half way from the rear end or tail of the lure body 10 to the nose or forward end 12 of the body, a treble hook 32 is secured to the lure body at one side thereof by means of a suitable hook hanger 34. The hook 32 is preferably mounted so that its shank will hang in the same plane as the plane in which the hook eyes 20 and 24 are oriented. It may be considered that the hook 32 is hung from the bottom side of the lure body 10, since, during retrieve, the side of the lure body 10 which carries the hook 32 will face downwardly in the water.

Also located on the bottom side of the lure body 10 are a pair of opposed, downwardly facing simulated fish eyes 36, one of which is shown in FIG. 1. These simulated eyes 36 are intended to simulate the eyes of a minnow, shad or other bait species, and are oriented to face downwardly so that they may be perceived by a game fish swimming below the lure during its retrieve, and considering whether to strike the bait.

In the illustrated embodiment of the invention, the lure is constructed of wood. It may, however, also be constructed of plastic or even metal under some circumstances. Where the lure 15 is of a plastic or metallic construction, it will usually include one or more air chambers for buoyancy.

UTILIZATION

In utilizing the lure of the invention, the lure is cast in the usual fashion from a rod and reel. During retrieve, the geometry and location of the hooks on the lure, and the inclusion of the elongated shaft 26 and washer 31 tend to cause the rear or tail portion of the lure to sink lower in the water than the foward or nose portion. The lure also rides with the eyes 36 facing downwardly, and with the belly hook 32 hanging downwardly from the lower side of the lure body.

As the fisherman retrieves the lure, he can work it in several ways, but in any of the ways that the lure can be worked, it remarkably resembles an aquatic forage species constituting the natural bait of the game fish. The simulated natural bait will be a surface feeding species, which swims with a side-to-side yawing motion in which it tends to jump along the surface of the water extending its nose or snout out of the water. It moves with a side-to-side motion in which the nose 12 of the lure body 10 moves back and forth repeatedly through an arc or curved path just above the surface of the water in those intervals when the nose of the lure is exposed above the water. A pull on the line will cause the lure to become almost completely submerged for a very brief interval before again popping up with the nose extending out of the water and wiggling from side-to-side through an arcuate path as the fisherman works the lure near a zone in the water where the game fish is possibly located.

This swimming action by the fishing lure of the invention is quite unique, and resembles several types of natural bait species. It has been remarkably effective for catching bass fish. It is believed that the unusual action is due in part to the rather unusual and unorthodox technique of securing the retrieving line to the small end of the lure body, rather than to the large end of the lure body, and due in part to placing the hooks at the described locations along the lure body.

Although a preferred embodiment of the lure has been herein described in order to afford an understanding of the lure adequate to permit those having ordinary skill in the art (fishing lure manufacturers) to understand how to make the lure at a time after the patent thereon shall have expired, and to avoid infringement of the claims appended hereto prior to that time. It will be understood that small changes and innovations in the lure which nevertheless continue to rely upon the same operating principles are intended to come within the scope of protection afforded when the following claims are given a reasonably expansive interpretation. Changes of the sort here referenced are, for example, changing the nature of the hook hanger 34 to which the belly hook 32 is secured, changing the precise location of the simulated eyes 36 facing downwardly on the lower side of the lure body, and mounting the fore-and-aft hook hangers in slightly different ways than the ways which are shown in the drawings. All changes of this type are deemed to be circumscribed by the spirit and scope of the invention, and to come within the scope of the claims appended hereto.

What is claimed is:

1. A top water fishing lure comprising:

an elongated symmetrical body free of outwardly extending diving planes over its entire length, and having a generally frustoconical forward portion tapering to a small, relatively pointed forward end, and said body further having a frustoellipsoidal rear end portion ending in a rear end which is relatively larger and more blunt than said small, relatively pointed forward end, said frustoconical forward end portion extending over at least the forward one-third of the total length of the lure body, and not more than about three-fourths of the total length of the lure body, and wherein said ellipsoidal end portion extends over at least the rear one-fourth of the total length of the lure body and not more than about one-half of the total length of the lure body, said lure body having a circular transverse cross-sectional configuration in every transverse cross-section plane extended perpendicular to its longitudinal axis anywhere along its length;

a retrieving line eye secured to the small forward end of the lure body for attachment of a retrieving line thereto; and a hook eye structure secured to the rear end of the lure body, said hook eye including:
an eye portion; and
an elongated shaft having a threaded pointed end at the end thereof opposite said eye portion, and threaded into the rear end of said lure body;

a flat first washer adjacent the rear end of the lure body and around the shaft of said hook eye structure;

a spherical spacer element having a bore extending diametrically therethrough in line with the opening through said washer, said diametrical bore surrounding said elongated shaft;

a second concavo-convex cap washer positioned adjacent said spherical spacer element, and on the opposite side thereof from said first washer, said cap washer having a concave side facing, and bearing against, said eye portion;

a first hook connected to the hook eye at the rear end of the lure body and limited by the cap washer in its movement on the eye portion to positions in which the barbs carried by the first hook will not impale or abrade said body;

a second hook connected to the lure body at a location on one side of the body between the forward end of the body and the rear end thereof, and being located closure to the forward end than to the rear end thereof, said second hook having its point of connection to the lure body lying in a plane containing the retrieving line eye and the hook eye and the longitudinal axis of the lure body extending between the forward end of the lure body and the rear end thereof, so that said second hook is on the bottom side of the lure and the pointed forward end of the lure periodically projects out of the water and waggles from side-to-side during retrieve of the lure; and a pair of simulated eyes resembling the eyes of a forage species affixed to the lure body on generally the same side thereof as the side which carries said second hook whereby said eyes appear to face downwardly in the water at a time when the lure is retrieved.

2. A top water fishing lure comprising:

an elongated symmetrical body having a generally frustoconical forward portion tapering to a relatively pointed forward end, and said body further having a frustoellipsoidal rear end portion ending in a rear end which is relatively larger and more blunt than said relatively pointed forward end, said frustoconical forward end portion extending over at least the forward one-third of the total length of the lure body, and not more than about three-fourths of the total length of the lure body, and wherein said ellipsoidal rear end portion extends over at least the rear one-fourth of the total length of the lure body and not more than about one-half of the total length of the lure body, said lure body having a circular transverse cross-sectional plane extended perpendicular to its longitudinal axis anywhere along its length;

a retrieving line eye secured to the small forward end of the lure body for attachment of a retrieving line thereto; and a hook eye structure secured to the rear end of the lure body, said hook eye including:

an eye portion; and an elongated shaft having a threaded pointed end at the end thereof opposite said eye portion, and threaded into the rear end of said lure body;

a flat first washer adjacent the rear end of the lure body and around the shaft of said hook eye structure;

a spherical spacer element having a bore extending diametrically therethrough in line with the opening through said washer, said diametrical bore surrounding said elongated shaft;

a second concavo-convex cap washer positioned adjacent said spherical spacer element, and on the opposite side thereof from said first washer, said cap washer having a concave side facing, and bearing against, said eye portion;

a first hook connected to the hook eye at the rear end of the lure body and limited by the cap washer in its movement on the eye portion to positions in which the barbs carried by the first hook will not impale or abrade said body; and a second hook connected to the lure body at a location on one side of the body between the forward end of the body and the rear end thereof, and being located closer to the forward end than to the rear end thereof, said second hook having its point of connection to the lure body lying in a plane containing the retrieving line eye and the hook eye and the longitudinal axis of the lure body extending between the forward end of the lure body and the rear end thereof, so that said second hook is on the bottom side of the lure and the pointed forward end of the lure periodically projects out of the water and waggles from side-to-side during retrieve of the lure.

* * * * *

UNITED STATES PATENT AND TRADEMARK OFFICE
CERTIFICATE OF CORRECTION

PATENT NO. : 4,999,942
DATED : March 19, 1991
INVENTOR(S) : Blake Gills

It is certified that error appears in the above-indentified patent and that said Letters Patent is hereby corrected as shown below:

Column 2, line 34, delete "onethird" and insert --one-third--.

Column 5, line 12, delete "closure" and insert --closer--.

Signed and Sealed this

Seventh Day of June, 1994

Attest:

BRUCE LEHMAN

Attesting Officer      Commissioner of Patents and Trademarks